United States Patent
Deokar

(10) Patent No.: US 11,976,840 B2
(45) Date of Patent: May 7, 2024

(54) DEVICES AND SYSTEMS FOR AIR CONDITIONING UNITS HAVING A SUBCOOLING LINE

(71) Applicant: Rheem Manufacturing Company, Atlanta, GA (US)

(72) Inventor: Pratik S. Deokar, Lewisville, TX (US)

(73) Assignee: Rheem Manufacturing Company, Atlanta, GA (US)

( * ) Notice: Subject to any disclaimer, the term of this patent is extended or adjusted under 35 U.S.C. 154(b) by 68 days.

(21) Appl. No.: 17/145,438

(22) Filed: Jan. 11, 2021

(65) Prior Publication Data

US 2022/0221186 A1      Jul. 14, 2022

(51) Int. Cl.
*F24F 11/81*         (2018.01)
*F24F 11/84*         (2018.01)
(Continued)

(52) U.S. Cl.
CPC .............. *F24F 11/81* (2018.01); *F24F 11/84* (2018.01); *F24F 11/873* (2018.01);
(Continued)

(58) Field of Classification Search
CPC ........ F25B 29/003; F25B 40/02; F25B 13/00; F25B 2400/0411; G05B 15/02; F24F 2110/10
See application file for complete search history.

(56) References Cited

U.S. PATENT DOCUMENTS 3,402,564 A     9/1968  Nussbaum
6,418,741 B1 *  7/2002  Nungesser .............. F25B 41/38
                                                      62/225
(Continued)

FOREIGN PATENT DOCUMENTS

CN      105276874 A  *  1/2016
CN      106907877 A  *  6/2017
(Continued)

OTHER PUBLICATIONS

"Oanh Nguyen, What Does a Heat Exchanger Do in an HVAC System?, Mar. 27, 2018, Refrigeration School, Inc, https://www.rsi.edu/blog/hvacr/heat-exchanger-hvac-system/" (Year: 2018).*

(Continued)

*Primary Examiner* — Santosh R Poudel
(74) *Attorney, Agent, or Firm* — Eversheds Sutherland (US) LLP

(57) ABSTRACT

The disclosed technology includes devices and systems for an air conditioning unit having a subcooling line. The disclosed technology can include a heat exchanger coil, a bypass line, and a subcooling line. A first valve can be in fluid communication with the subcooling line and a second valve can be in fluid communication with the bypass line. When the air conditioning unit is operating in a cooling mode, the first valve can be configured to permit refrigerant to flow through the subcooling line and the second valve can be configured to prevent refrigerant from flowing through the bypass line. When the air conditioning unit is operating in a heating mode, the first valve can be configured to prevent refrigerant from flowing through the subcooling line and the second valve can be configured to permit refrigerant to flow through the bypass line.

18 Claims, 5 Drawing Sheets

Heating Mode

(51) Int. Cl.
    *F24F 11/873*     (2018.01)
    *F25B 29/00*     (2006.01)
    *F25B 40/02*     (2006.01)
    *G05B 15/02*     (2006.01)
    *F24F 110/10*     (2018.01)

(52) U.S. Cl.
    CPC ............ *F25B 29/003* (2013.01); *F25B 40/02* (2013.01); *G05B 15/02* (2013.01); *F24F 2110/10* (2018.01)

(56) References Cited

U.S. PATENT DOCUMENTS

| | | | |
|---|---|---|---|
| 2014/0138064 A1* | 5/2014 | Jang | F24F 1/0063 165/108 |
| 2017/0211853 A1* | 7/2017 | Feng | F25B 41/20 |
| 2018/0361828 A1* | 12/2018 | Kato | F25B 6/04 |
| 2019/0154311 A1* | 5/2019 | Miura | F25B 40/00 |
| 2020/0049392 A1* | 2/2020 | Tanaka | F25B 47/025 |

FOREIGN PATENT DOCUMENTS

| | | | |
|---|---|---|---|
| JP | 03271661 A | * | 12/1991 |
| JP | 2003004335 A | | 8/2003 |
| JP | 4053082 B2 | | 2/2008 |
| RU | 2199706 C2 | | 2/2003 |

OTHER PUBLICATIONS

PCT, "International Search Report & Written Opinion" Application No. PCT/US2022/011748, dated Jul. 4, 2022.

\* cited by examiner

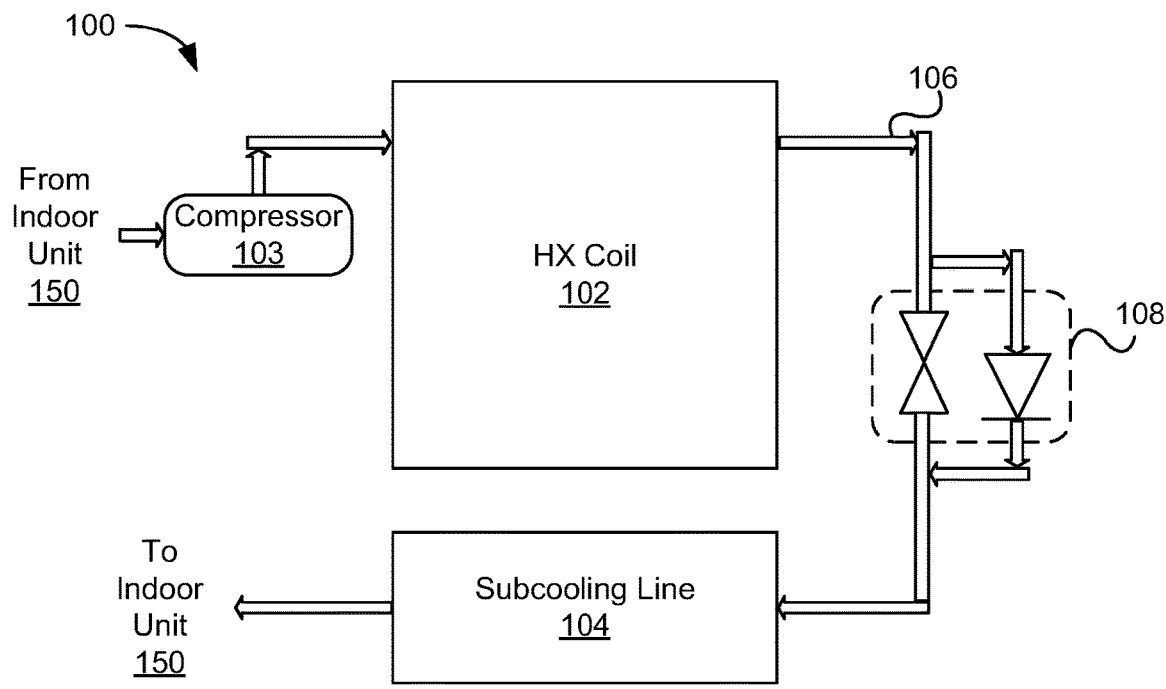
FIG. 1A – Cooling Mode
PRIOR ART
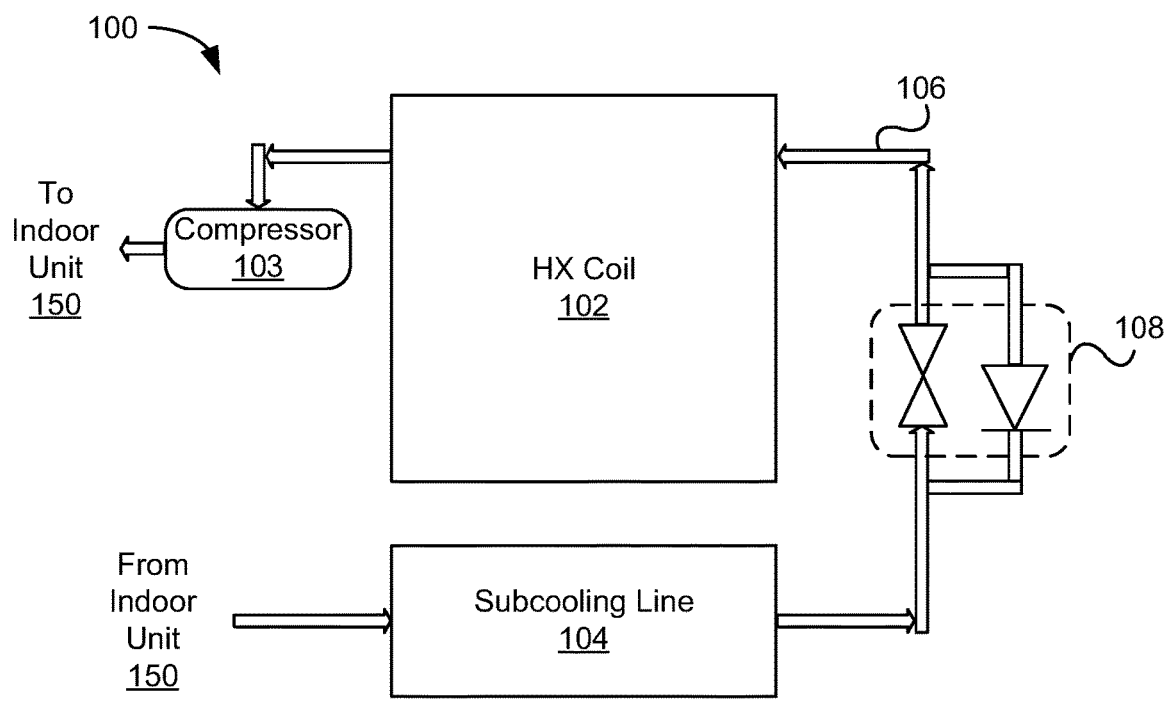
FIG. 1B – Heating Mode
PRIOR ART

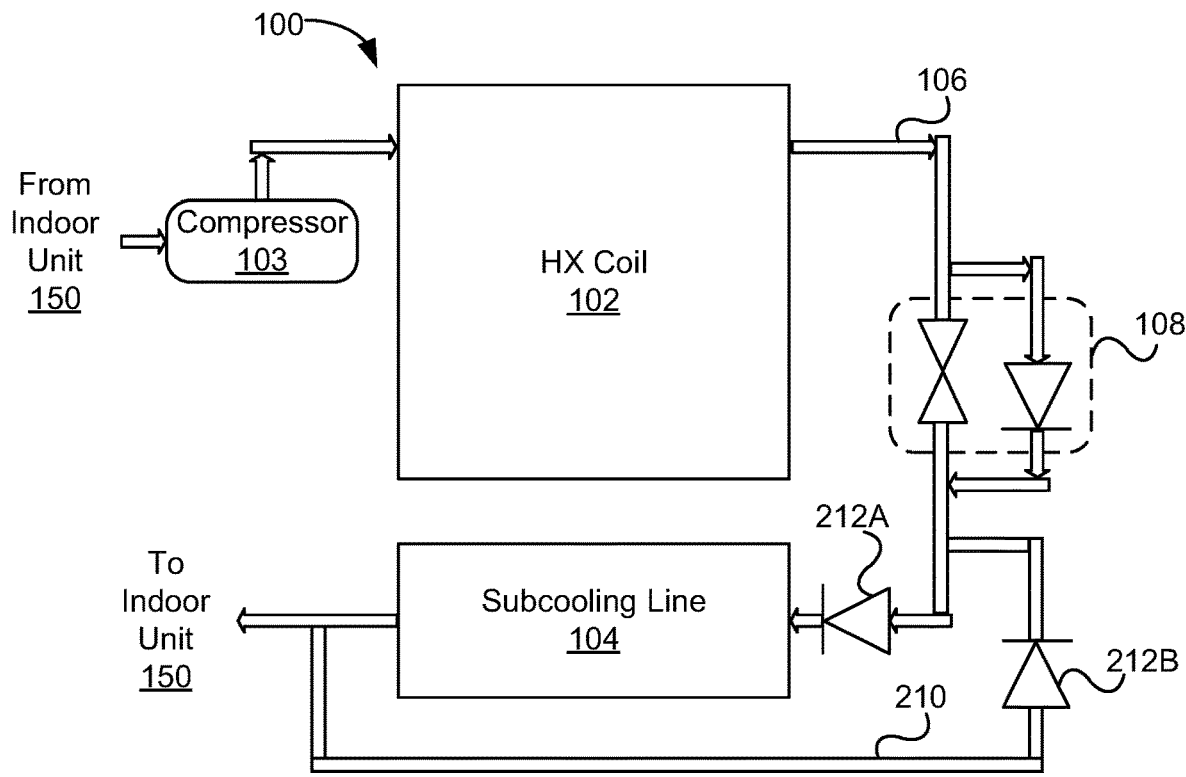
FIG. 2A – Cooling Mode
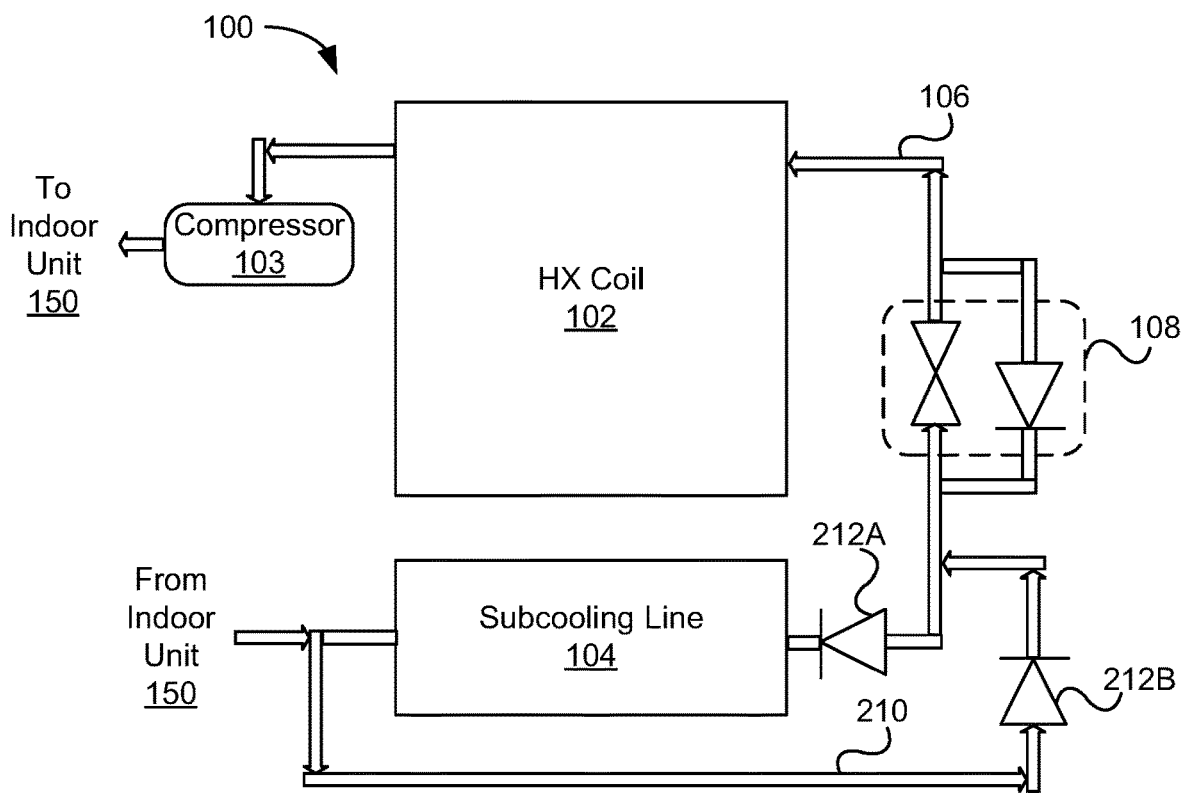
FIG. 2B – Heating Mode

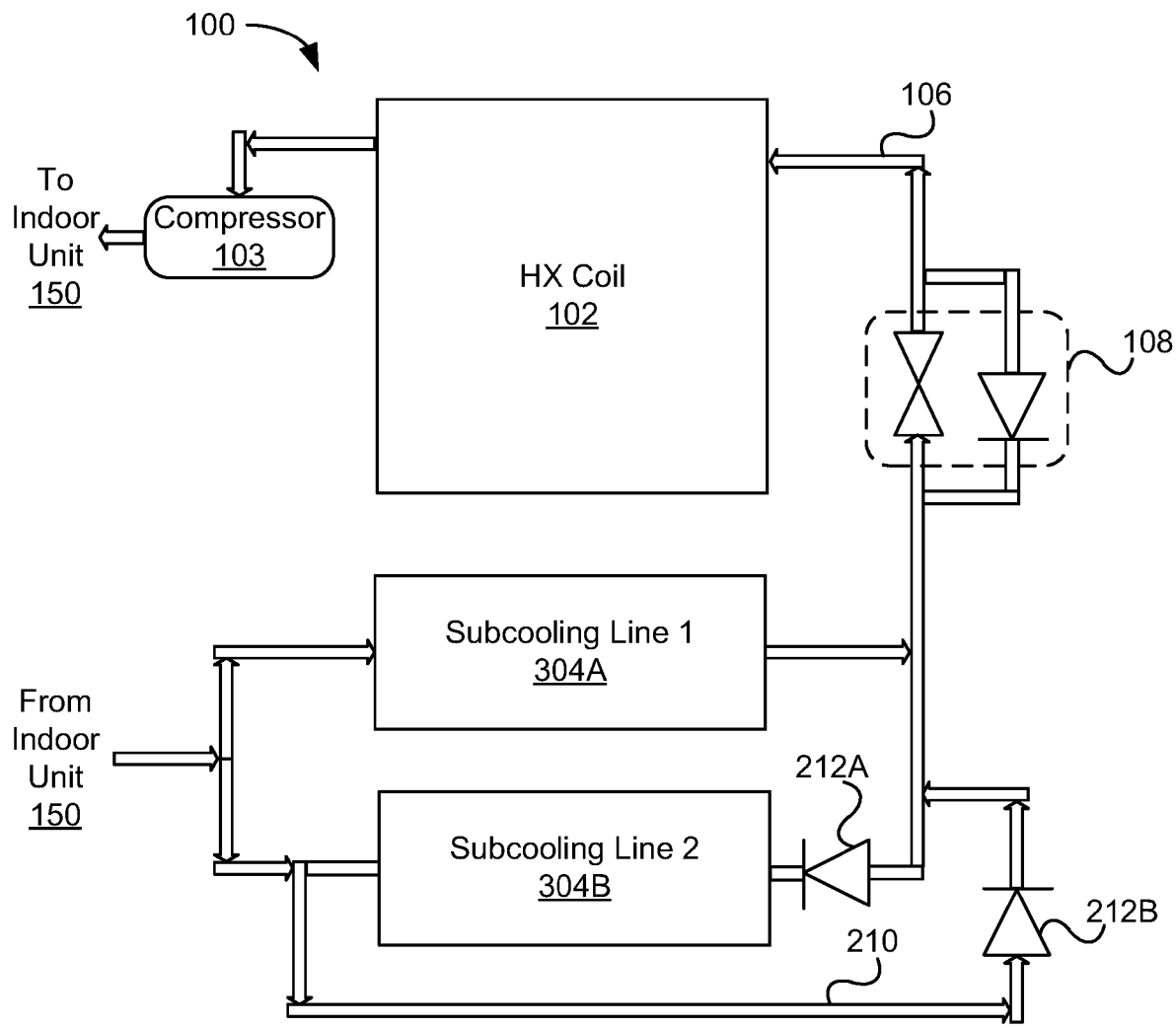
FIG. 3 – Heating Mode

DEVICES AND SYSTEMS FOR AIR CONDITIONING UNITS HAVING A SUBCOOLING LINE

FIELD OF TECHNOLOGY

The disclosed technology relates generally to devices and systems for use with an air conditioning system having a subcooling line.

BACKGROUND

Subcooling of a refrigerant occurs when the temperature of the refrigerant is less than the saturation temperature of the refrigerant. Subcooling is an essential characteristic of an air conditioning system and is often used to determine the efficiency of the air conditioning system. Generally, the more a refrigerant is subcooled at a condenser coil before returning to an evaporator coil, the more efficient the air conditioning system will be because the refrigerant will be capable of absorbing more heat while flowing through the evaporator coil.

To help increase the degree to which a refrigerant is subcooled, some existing air conditioning systems include a subcooling line as depicted in FIGS. 1A and 1B. The subcooling line 104 can be installed on an air conditioning unit such as an outdoor unit 100. The subcooling line 104 is generally connected to an expansion and check valve assembly 108 and a heat exchanger coil 102 by a refrigerant line 106. When the outdoor unit 100 is operating in a cooling mode, the hot superheated refrigerant gases from a compressor 103 (this compressor 103 can be located inside the outdoor unit 100 itself) flows through the heat exchanger coil 102, through the check valve of the expansion and check valve assembly 108, and through the subcooling line 104 before flowing to the indoor unit 150. The subcooling line 104 is arranged such that the refrigerant releases additional heat to the atmosphere before returning the refrigerant to the indoor unit 150. By releasing additional heat to the atmosphere while passing through the subcooling line 104, the refrigerant is further subcooled and the overall efficiency of the air conditioning system is increased. When the outdoor unit 100 is in a heating mode, however, the subcooling line 104 can reduce the efficiency of the air conditioning system because additional heat is lost at the subcooling line 104 before the high pressure refrigerant is converted to two-phase low pressure fluid by the expansion device of the expansion and check valve assembly (108) and travels through the heat exchanger coil 102. Because additional heat is lost at the subcooling line 104 when the outdoor unit 100 is in the heating mode, the heat exchanger coil 102 must gain more heat to ensure the refrigerant is sufficiently super-heated before passing to the compressor 103. This results in an unnecessary loss of efficiency for the air conditioning system. Furthermore, in conditions where the refrigerant is unable to gain a sufficient amount of heat when passing through heat exchanger coil 102 to reach a superheated condition, a portion of the refrigerant can remain in a liquid state and cause damage to the compressor 103.

What is needed, therefore, is a device and system that can utilize the efficiency gains provided by the subcooling line when the air conditioning system is in a cooling mode while also reducing the inefficiencies caused by the subcooling line when the air conditioning system is in a heating mode.

These and other problems are addressed by the technology disclosed herein.

SUMMARY

The disclosed technology relates generally to devices and systems for use with an air conditioning system having a subcooling line. The disclosed technology can include an air conditioning unit having a heat exchanger coil, an expansion and check valve assembly, a subcooling line in fluid communication with the heat exchanger coil, and a bypass line in fluid communication with the heat exchanger coil. The bypass line can be configured to route a refrigerant around the subcooling line.

The air conditioning unit can include a first valve in fluid communication with the subcooling line and the heat exchanger coil and a second valve in fluid communication with the bypass line and the heat exchanger coil. When the air conditioning unit is operating in a cooling mode, the first valve can be configured to permit the refrigerant to flow through the subcooling line and the second valve can be configured to prevent the refrigerant from flowing through the bypass line. When the air conditioning unit is operating in a heating mode, the first valve can be configured to prevent the refrigerant from flowing through the subcooling line and the second valve can be configured to permit the refrigerant to flow through the bypass line. At least one of the first valve and the second valve can be a check valve.

The air conditioning unit can have a second subcooling line in fluid communication with the heat exchanger coil. The second subcooling line can be configured to permit refrigerant to flow through the second subcooling line both when the air conditioning unit is operating in the cooling mode and when the air conditioning unit is operating in the heating mode.

The first valve can be a first electronically controlled valve and the second valve can be a second electronically controlled valve. A controller can be in electrical communication with the first electronically controlled valve and the second electronically controlled valve. When the air conditioning unit is in the cooling mode, the controller can be configured to output a first control signal to the first electronically controlled valve to cause the first electronically controlled valve to open to permit the refrigerant to flow through the subcooling line. When the air conditioning unit is in the cooling mode, the controller can be further configured to output a second control signal to the second electronically controlled valve to cause the second electronically controlled valve to close to prevent the refrigerant from flowing through the bypass line.

Alternatively, or in addition, when the air conditioning unit is in the heating mode, the controller can be configured to output a first control signal to the first electronically controlled valve to cause the first electronically controlled valve to close to prevent the refrigerant from flowing through the subcooling line. When the air conditioning unit is in the heating mode, the controller can be further configured to output a second control signal to the second electronically controlled valve to cause the second electronically controlled valve to open to permit the refrigerant to flow through the bypass line. Furthermore, when the air conditioning unit is in the heating mode, the controller can be further configured to output a third control signal to throttle the first electronically controlled valve to permit a portion of the refrigerant to flow through the subcooling line.

The first valve can be located in a fluid path between the subcooling line and the heat exchanger coil. The subcooling line can be configured to store an amount of refrigerant when the air conditioning unit is in the heating mode. The air conditioning unit can comprise an expansion and check valve assembly and the first valve can be located in a fluid path between the subcooling line and the expansion and check valve assembly.

The disclosed technology can include an air conditioning unit having a heat exchanger coil, a subcooling line in fluid communication with the heat exchanger coil, and a bypass line in fluid communication with the heat exchanger coil. The bypass line can be configured to route a refrigerant around the subcooling line. The air conditioning unit can include a valve in fluid communication with the subcooling line, the bypass line, and the heat exchanger coil.

When the air conditioning unit is operating in a cooling mode, the valve can be configured to permit the refrigerant to flow through the subcooling line and prevent the refrigerant from flowing through the bypass. When the air conditioning unit is operating in a heating mode, the valve can be configured to prevent the refrigerant from flowing through the subcooling line and permit the refrigerant to flow through the bypass line. The valve can be a three-way check valve or an electronically controlled three-way valve.

The subcooling line can be configured to store an amount of refrigerant when the air conditioning unit is operating in the heating mode. The valve can be located in a fluid path between the subcooling line, the bypass line, and an expansion and check valve assembly.

The air conditioning unit can include a second subcooling line in fluid communication with the heat exchanger coil. The second subcooling line can be configured to permit refrigerant to flow through the second subcooling line both when the air conditioning unit is operating in the cooling mode and when the air conditioning unit is operating in the heating mode.

The air conditioning unit can include a controller in electrical communication with the electronically controlled three-way valve. When the air conditioning unit is operating in the cooling mode, the controller can be configured to output a control signal to the electronically controlled three-way valve to cause the electronically controlled three-way valve to change its position to permit the refrigerant to flow through the subcooling line and prevent the refrigerant from flowing through the bypass line. When the air conditioning unit is operating in the heating mode, the controller can be configured to output a control signal to the electronically controlled three-way valve to cause the electronically controlled three-way valve to change its position to prevent the refrigerant from flowing through the subcooling line and permit the refrigerant to flow through the bypass line.

The control signal can be a first control signal. When the air conditioning unit is operating in the heating mode, the controller can be further configured to output a second control signal to throttle the electronically controlled three-way valve to permit a portion of the refrigerant to flow through the subcooling line.

The air conditioning unit can have a second subcooling line in fluid communication with the heat exchanger coil. The second subcooling line can be configured to permit the refrigerant to flow through the second subcooling line both when the air conditioning unit is operating in the cooling mode and when the air conditioning unit is operating in the heating mode.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

FIG. 1A illustrates an existing air conditioning system in cooling mode.

FIG. 1B illustrates an existing air conditioning system in heating mode.

FIG. 2A illustrates an example air conditioning system in cooling mode, in accordance with the disclosed technology.

FIG. 2B illustrates the example air conditioning system of FIG. 2A in heating mode, in accordance with the disclosed technology.

FIG. 3 illustrates an example air conditioning system having multiple subcooling lines while in heating mode, in accordance with the disclosed technology.

DETAILED DESCRIPTION

Figure 4:
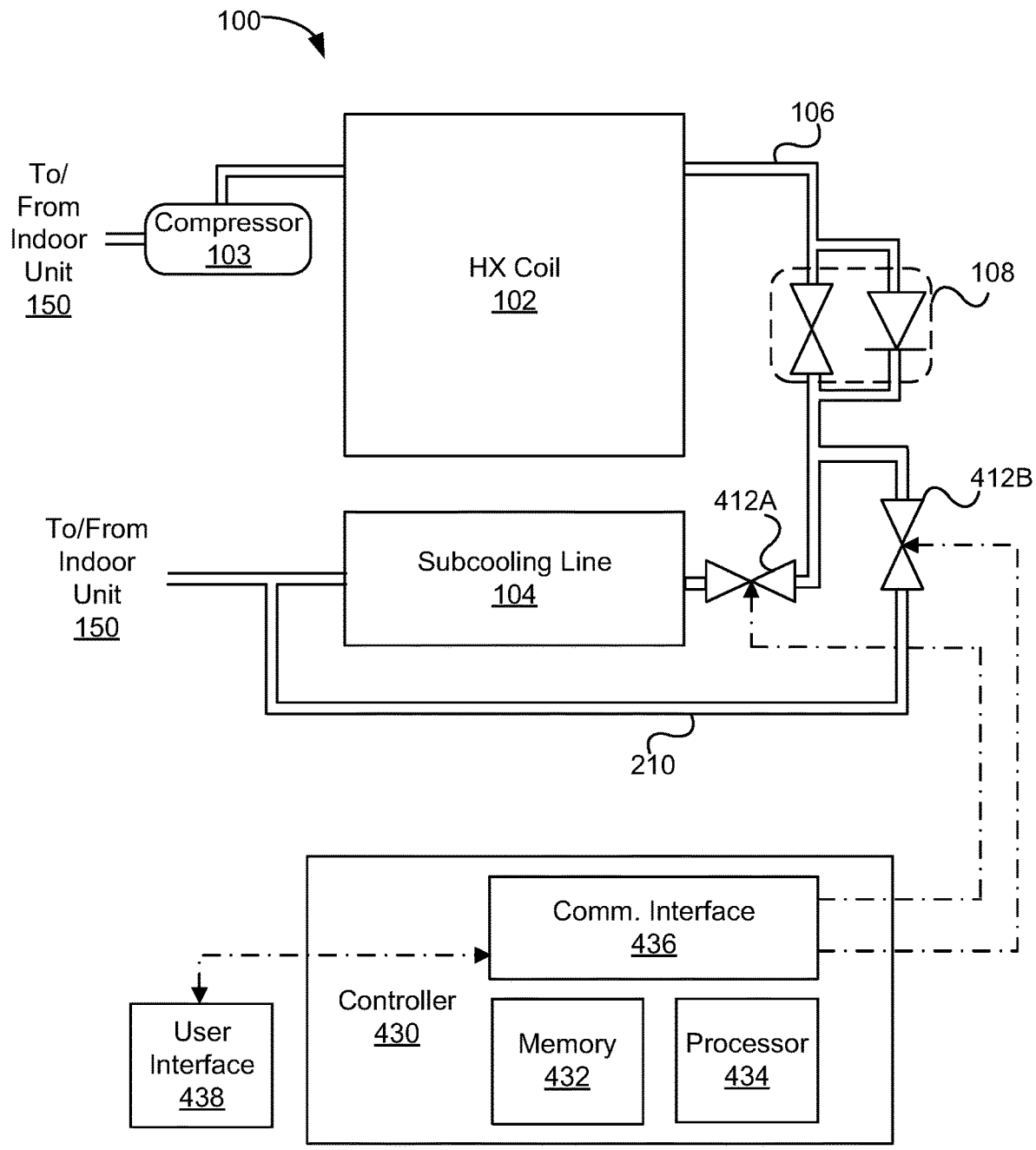
FIG. 4 illustrates an example air conditioning system having a subcooling line and electronically controlled valves, in accordance with the disclosed technology.

The disclosed technology can include an air conditioning unit that has a subcooling line, a bypass line, and one or more valves configured to direct refrigerant through the subcooling line, through the bypass line, or both. A valve can be installed in a fluid path between the subcooling line and an expansion and check valve assembly that can permit refrigerant to flow through the subcooling line when the air conditioning unit is in a cooling mode but prevent the refrigerant from flowing through the subcooling line when the air conditioning unit is in a heating mode. The bypass line can be configured to route refrigerant from the expansion and check valve assembly to the indoor unit to bypass the subcooling line. The bypass line can include, or be in a fluid path with, a valve that can permit refrigerant to flow through the bypass line when the air conditioning unit is in a heating mode but prevent the refrigerant from flowing through the bypass line when the air conditioning unit is in a cooling mode. By including the bypass line and one or more valves in line with the subcooling line and the bypass line, the air conditioning unit can utilize the efficiency gains provided by the subcooling line when the air conditioning unit is in a cooling mode while also reducing the inefficiencies caused by the subcooling line when the air conditioning unit is in a heating mode. As non-limiting examples, the valves can be check valves, electronically controlled valves, or even a single three-way valve. As will become apparent throughout this disclosure, the disclosed technology can include various configurations with each configuration being capable of increasing the efficiency of the air conditioning unit in both a cooling mode and a heating mode.

Although certain examples of the disclosed technology are explained in detail herein, it is to be understood that other examples, embodiments, and implementations of the disclosed technology are contemplated. Accordingly, it is not intended that the disclosed technology is limited in its scope to the details of construction and arrangement of components expressly set forth in the following description or illustrated in the drawings. The disclosed technology can be implemented in a variety of examples and can be practiced or carried out in various ways. In particular, the presently disclosed subject matter is described in the context of being devices and systems for use with an outdoor air conditioning unit. The present disclosure, however, is not so limited, and can be applicable in other contexts. The present disclosure, for example and not limitation, can include devices and systems for use with an indoor air conditioning unit. Furthermore, the present disclosure can include other air conditioning or refrigeration heat exchanger units that utilize a subcooling line including systems that utilize a fluid other than air to facilitate heat transfer across the heat exchanger coil (e.g., air conditioning or refrigeration systems that use nitrogen, argon, helium, hydrogen, water vapor, water, glycol, silicone oil, hydrocarbons, salt brines, or any other suitable type of heat transfer fluid). Such implementations and applications are contemplated within the scope of the present disclosure. Accordingly, when the present disclosure is described in the context of being devices and systems for use with an outdoor air conditioning unit, it will be understood that other implementations can take the place of those referred to.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the examples, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the various examples of the disclosed technology includes from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the example methods and processes described herein. That is, the disclosed technology includes methods that omit one or more steps expressly discussed with respect to the examples provided herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

Referring now to the drawings, in which like numerals represent like elements, the present disclosure is herein described. As depicted in FIGS. 2A and 2B, the disclosed technology can include an air conditioning unit, such as an outdoor unit 100, having various components connected to each other via a refrigerant line 106. FIG. 2A depicts the outdoor unit 100 in a cooling mode while FIG. 2B depicts the outdoor unit 100 in a heating mode. As will be appreciated by one of skill in the art, the various components described herein can be part of a refrigerant cycle configured to transfer heat between the outdoor unit 100 and a connected indoor unit 150 by cycling a refrigerant through a refrigerant circuit including the outdoor unit 100 and the indoor unit 150. The outdoor unit 100 can be configured to cycle refrigerant in one direction while in a cooling mode (as depicted by the directional arrows in FIG. 2A) and in another direction while in a heating mode (as depicted by the direction arrows in FIG. 2B). Although described as an outdoor unit 100, the outdoor unit 100 can be installed in any suitable location, including inside of a building or outside of a building. Similarly, although described as an indoor unit 150, the indoor unit 150 can be installed in any suitable location, whether inside of a building or outside of a building. Thus, the terms "indoor" and "outdoor" are used herein solely for explanatory purposes and should not be construed as limiting the particular air conditioning unit for use in a particular location.

The various components of the outdoor unit 100 connected by the refrigerant line 106 can include a heat exchanger coil 102, a subcooling line 104, an expansion and check valve assembly 108, a bypass line 210, a first valve 212A, and a second valve 212B. As will become apparent throughout this disclosure, the disclosed technology can provide several benefits over the prior art by routing the refrigerant either through the subcooling line 104 or through the bypass line 210 by opening or closing the first valve 212A and the second valve 212B depending on whether the outdoor unit 100 is operating in a heating mode or a cooling mode.

The heat exchanger coil 102 can be configured such that the refrigerant can pass through the heat exchanger coil 102 and either transfer heat from the refrigerant to the atmosphere surrounding the heat exchanger coil 102 or absorb heat from the atmosphere. In this way, the heat exchanger coil 102 can be configured to act as a condensing coil or an evaporator coil depending on whether the outdoor unit 100 is operating in a heating mode or a cooling mode. The heat exchanger coil 102 can be any type of heat exchanger coil used in an air conditioning system, including, but not limited to, a bare tube, a plate-type, a microchannel, a finned coil, or any other suitable type of coil for the application.

The expansion and check valve assembly 108 can be any type of expansion and check valve assembly suitable for the application. For example, the expansion device of the expansion and check valve assembly 108 can be a thermal expansion valve, an electronic expansion valve, a capillary tube expansion device, or any other suitable expansion device for the application. The expansion device of the expansion and check valve assembly 108 can be internally equalized or an externally equalized. The expansion and check valve assembly 108 can be located in a fluid path between the heat exchanger coil 102 and the subcooling line 104. In heating mode, the expansion device of the expansion and check valve assembly 108 can be configured to help regulate the superheat of the refrigerant located downstream of the heat exchanger coil 102 using a temperature sensing bulb or temperature sensor. In cooling mode, the check valve of the expansion and check valve assembly 108 can open and the refrigerant can bypass the expansion device of the expansion and check valve assembly 108.

As depicted by the directional arrows in FIG. 2A, the subcooling line 104 can be located in a fluid path downstream of the heat exchanger coil 102 and the expansion and check valve assembly 108 when the outdoor unit 100 is in the cooling mode. On the other hand, as depicted by the directional arrows in FIG. 2B, when the outdoor unit 100 is in a heating mode the direction of the refrigerant will be reversed and the subcooling line 104 can be located in a fluid path upstream of the heat exchanger coil 102 and the expansion and check valve assembly 108. When the outdoor unit 100 is in the cooling mode, the subcooling line 104 can be configured to cause further subcooling of the refrigerant after the refrigerant has passed through the heat exchanger coil 102 but before the refrigerant is passed to the indoor unit 150. The subcooling line 104, for example and not limitation, can be an additional heat exchanger coil or simply be piping that is configured to allow further heat transfer of the refrigerant to the atmosphere. The subcooling line 104 can be routed near a targeted portion of the heat exchanger coil 102 (e.g., a bottom portion, a middle portion, a top portion, or any other portion of the heat exchanger coil 102 that is likely to accumulate frost). In this way, the subcooling line 104 can be configured to transfer heat from the refrigerant to the air being directed across the heat exchanger coil 102 resulting in further subcooling. Furthermore, by being routed near the targeted portion of the heat exchanger coil 102, the subcooling line 104 can be configured to transfer heat from the refrigerant to the air near the targeted portion of the heat exchanger coil 102 when the outdoor unit 100 is in the heating mode causing the ambient air near the targeted portion of the heat exchanger coil 102 to be heated and helping to prevent frost from accumulating on the heat exchanger coil 102. Alternatively, or in addition, the subcooling line 104 can be configured to transfer heat from the refrigerant to fins on the air side of the heat exchanger coil 102 and/or any other thermal bridges shared by subcooling line 104 and heat exchanger coil 102. As before, the heat from the refrigerant can be transferred to the heat exchanger coil 102 via the fins or other thermal bridges near the targeted portion of the heat exchanger coil 102 helping to prevent frost from accumulating on the heat exchanger coil 102. Alternatively, the subcooling line 104 can be routed near a middle, top, or be routed a distance away from the heat exchanger coil 102.

The bypass line 210 can be an alternate refrigerant path between the indoor unit 150 and the expansion and check valve assembly 108 and heat exchanger coil 102. For example, the bypass line 210 can be configured to route the refrigerant around the subcooling line 104 rather than through the subcooling line 104. The bypass line 210 can be configured to connect to the refrigerant line 106 upstream and downstream of the subcooling line 104. In this way, and as described in greater detail herein, the bypass line 210 can be configured to reduce the amount of heat lost through the subcooling line, particularly when the outdoor unit 100 is in the heating mode. The bypass line 210 can simply be an additional refrigerant line similar to the refrigerant line 106, or the bypass line 210 can be made from piping, tubing, or another component configured to route the refrigerant around the subcooling line 104 to a location upstream of the expansion and check valve assembly 108.

The first valve 212A and the second valve 212B, as depicted in FIGS. 2A and 2B, can both be a check valve configured to allow the flow of refrigerant in a first direction but prevent the flow of refrigerant in a second direction. Specifically, first valve 212A can be a check valve oriented such that the first valve 212A permits refrigerant to flow through the subcooling line 104 when the outdoor unit 100 is in the cooling mode, but prevents the refrigerant from flowing through the subcooling line 104 when the outdoor unit 100 is in the heating mode. Similarly, the second valve 212B can be a check valve oriented such that the second valve 212B prevents the refrigerant from flowing through the bypass line 210 when the outdoor unit 100 is in the cooling mode but allows refrigerant to flow through the bypass line 210 when the outdoor unit 100 is in the heating mode. Thus, the first valve 212A and the second valve 212B can be configured together to direct the refrigerant only through the subcooling line 104 when the outdoor unit 100 is in the cooling mode (as depicted by the directional arrows in FIG. 2A) and only through the bypass line 210 when the outdoor unit 100 is in the heating mode (as depicted by the directional arrows in FIG. 2B). In this way, the outdoor unit 100 can be configured to allow for further subcooling of the refrigerant through the subcooling line 104 when the outdoor unit 100 is in the cooling mode while also reducing inefficient heat loss caused by the refrigerant passing through the subcooling line 104 prior to entering the heat exchanger coil 102 while in the heating mode. In other words, by including the first valve 212A, the second valve 212B, and the bypass line 210, the enthalpy of the refrigerant downstream of subcooling line 104 will be decreased when the outdoor unit 100 is in the cooling mode because the refrigerant traveling from the outdoor unit 100 to the indoor unit 150 will be further subcooled in the subcooling line 104. Furthermore, the enthalpy of the refrigerant will also be higher upstream of the heat exchanger coil 102 when the outdoor unit 100 is in the heating mode because the refrigerant will not lose heat at the subcooling line 104 before its expansion in the expansion and check valve assembly 108 because the refrigerant is routed around the subcooling line 104 using bypass line 210.

Optionally, the first valve 212A and the second valve 212B can be combined into a single three-way check valve configured to prevent the refrigerant from flowing through the bypass line 210 but allowing the refrigerant to flow through the subcooling line 104 when the outdoor unit 100 is in the cooling mode. Similarly, the three-way check valve can be configured to permit refrigerant to flow through the bypass line 210 but prevent refrigerant from flowing through the subcooling line 104 when the outdoor unit 100 is in the heating mode.

By positioning the first valve 212A in a fluid path between the subcooling line 104 and the expansion and check valve assembly 108, the first valve 212A can be configured to prevent flow of the refrigerant through the subcooling line 104 such that an amount of refrigerant can be stored in the subcooling line 104 when the outdoor unit 100 is in the heating mode. By storing an amount of refrigerant in the subcooling line 104, the subcooling line 104 can act as a charge compensator when the outdoor unit 100 is in the heating mode to remove extra condensed refrigerant from circulation. Cool air passing over the subcooling line 104 can cause the warmer refrigerant to be drawn into the closed off subcooling line 104 much like a charge compensator. Because the subcooling line 104 can act as a charge compensator, a smaller charge compensator can be installed in the air conditioning system. Optionally, the subcooling line 104 can be sized such that a separate, dedicated charge compensator can be omitted from the system because the needed charge compensating functionality can be performed entirely by the subcooling line 104 when the system is in heating mode. This can decrease the overall cost and complexity of the system.

One drawback to preventing the refrigerant from flowing through the subcooling line 104 when the outdoor unit 100 is in the heating mode is that warm refrigerant is no longer passed through the subcooling line 104 to release heat near a bottom portion of the heat exchanger coil 102. Because the subcooling line 104 is not releasing heat near the bottom portion of the heat exchanger coil 102 when the outdoor unit 100 is in the heating mode, frost is more likely to accumulate on the heat exchanger coil 102 at lower air temperatures. One way of preventing frost accumulation on the heat exchanger coil 102 while also realizing the benefits provided by routing the refrigerant through the bypass line 210 when the outdoor unit 100 is in the heating mode is to include more than one subcooling line 104 (i.e., two or more subcooling lines 104). For example, as depicted in FIG. 3, the disclosed technology can include an outdoor unit 100 having a first subcooling line 304A and a second subcooling line 304B. The other components depicted in FIG. 3 can include all of the same features previously described in relation to the other components.

As depicted in FIG. 3, the outdoor unit 100 can include the first valve 212A in a fluid path between the second subcooling line 304B and the expansion and check valve assembly 108. In this way, the configuration of the second subcooling line 304B with the first valve 212A can act the same as previously described. In other words, the first valve 212A can prevent the refrigerant from flowing through the second subcooling line 304B when the outdoor unit is in the heating mode while permitting the refrigerant to flow through the second subcooling line 304B when the outdoor unit 100 is in the cooling mode. On the other hand, the first subcooling line 304A can be installed without a valve upstream or downstream of the first subcooling line 304A such that the refrigerant can flow through the first subcooling line 304A regardless of whether the outdoor unit 100 is in the heating mode or the cooling mode. Thus, the outdoor unit 100 can have some refrigerant flowing through the first subcooling line 304A as well as the bypass line 210 when the outdoor unit 100 is in the heating mode. In this way, higher temperature refrigerant can be delivered to the heat exchanger coil 102 by passing through the bypass line 210 while also some heat can be transferred to the heat exchanger coil 102 to prevent frost accumulation by passing the refrigerant through the first subcooling line 304A. Optionally, the subcooling line that is not bypassed (e.g., the first subcooling line 304A) can be located closer to the heat exchanger coil 102 than the bypassed subcooling line(s) (e.g., the second subcooling line 304B), which can permit a greater amount of heat from the non-bypassed subcooling line to transfer to the heat exchanger coil 102. Additionally, by preventing the refrigerant from flowing through the second subcooling line 304B by the first valve 212A, the outdoor unit 100 can additionally have the benefit of the second subcooling line 304B acting as a charge compensator.

The first subcooling line 304A and the second subcooling line 304B can be configured such that they are interlaced or wrapped around each other. Alternatively, the first subcooling line 304A can be at a location that is separate from the second subcooling line 304B. For example, the first subcooling line 304A can be installed near the bottom portion of the heat exchanger coil 102 while the second subcooling line 304B can be installed near the middle portion of the heat exchanger coil 102, top portion of the heat exchanger coil 102, or altogether separate from the heat exchanger coil 102 and the first subcooling line 304A. The first subcooling line 304A and the second subcooling line 304B can be configured such that they are interlaced or wrapped around the heat exchanger coil 102. Optionally, the outdoor unit 100 can include more than two subcooling lines 304 (e.g., 304A, 304B . . . 304n) such as three, four, five, ten, or more to fit the particular application. As will be appreciated by one of skill in the art, the outdoor unit 100 can have as many subcooling lines 304 as suitable for the particular application, and the multiple subcooling lines 304 can be arranged with or without a valve 212A to allow or prevent refrigerant from flowing through one or more of the subcooling lines 304 when in the heating mode.

The subcooling line 304A can be in thermal communication with a phase change material. The phase change material can be configured to store heat energy received from the refrigerant in the subcooling line 304A. For example, when the outdoor unit 100 is in the cooling mode, the phase change material can receive and store heat energy released by the refrigerant as it flows through the subcooling line 304A. When the outdoor unit 100 is operated in a heating mode, the heat energy stored in the phase change material can be absorbed by the refrigerant flowing through subcooling line 304A and increase the enthalpy of the refrigerant before the refrigerant enters the heat exchanger coil 102. By absorbing the stored heat energy from the phase change material, the refrigerant does not need to gain as much heat energy from the atmosphere to become superheated. This in turn can delay an excessive drop in refrigerant temperature and pressure at the heat exchanger coil 102 and help to prevent frost accumulation on the heat exchanger coil 102. Furthermore, if the subcooling line 304A is positioned near the heat exchanger coil 102, the heat energy stored in the phase change material can be released to the heat exchanger coil 102 to help prevent frost accumulation.

Should the system include multiple subcooling lines 304, one or more of the subcooling lines 304 can each include a valve 212A that is arranged such that the refrigerant can flow through the one or more subcooling lines 304 when the outdoor unit 100 is in a heating mode but not when the outdoor unit 100 is in a cooling mode. For example, in situations where it is desirable to have heat transferred from the one or more subcooling lines 304 to the heat exchanger coil 102 to prevent frost accumulation but it is not desirable to have additional subcooling, the valve 212A can be in a reversed position than that previously described.

As depicted in FIG. 4, the disclosed technology can include an outdoor unit 100 having a first electronically controlled valve 412A and a second electronically controlled valve 412B that can be in communication with, and controlled by, a controller 430. The first electronically controlled valve 412A and the second electronically controlled valve 412B can be configured to transition between a fully opened position and a fully closed position. Alternatively, or in addition, the first electronically controlled valve 412A and the second electronically controlled valve 412B can be configured to be partially opened. For example, the first electronically controlled valve 412A and the second electronically controlled valve 412B can be configured to be throttled to be 10% opened, 25%, opened, 33% opened, 50% opened, 67% opened, 75% opened, or any other position between fully opened and fully closed. In this way, the controller 430 can be configured to open the first electronically controlled valve 412A and/or the second electronically controlled valve 412B partially to allow a reduced amount of refrigerant to pass through the subcooling line 104 and/or the bypass line 210.

The first electronically controlled valve 412A and the second electronically controlled valve 412B can be any type of electronically controlled valve that would be suitable for the particular application. For example, the first electronically controlled valve 412A and the second electronically controlled valve 412B can be or include a motor operated valve or a solenoid operated valve. Furthermore, the first electronically controlled valve 412A and the second electronically controlled valve 412B can be or include a ball valve, a plug valve, a butterfly valve, a gate valve, a globe valve, a needle valve, a coaxial valve, an angle seat valve, or any other type of valve that would be suitable for the particular application.

The controller 430 can be configured to open the first electronically controlled valve 412A and the second electronically controlled valve 412B slowly or at a suitable speed to help ensure a slug of subcooled refrigerant is not pushed from the subcooling line 104 toward the indoor unit 150 when the outdoor unit 100 is switched from the heating mode to the cooling mode. For example, when the first valve 212A (or first electronically controlled valve 412A) is fully closed, subcooled refrigerant will accumulate in the subcooling line 104. When the outdoor unit 100 switches from the heating mode to the cooling mode, all of the accumulated subcooled refrigerant as well as the first valve 212A can have a built-up inertia that can be difficult for the compressor 103 in the air conditioning system to overcome, potentially causing damage to the compressor 103 or causing an instantaneous excess power consumption by the compressor 103. Thus, by slowly opening the first electronically controlled valve 412A and slowly closing the second electronically controlled valve 412B, the outdoor unit 100 can be protected from damage that could otherwise occur if the first electronically controlled valve 412A and the second electronically controlled valve 412B were fully opened as soon as the outdoor unit 100 transitioned to the cooling mode.

The controller 430 can be further configured to help prevent frost accumulation on the heat exchanger coil 102. As an example, the controller 430 can be configured to throttle the first electronically controlled valve 412A to partially open to permit a portion of the refrigerant to pass through the subcooling line 104 to allow the subcooling line 104 to remain heated to help prevent frost accumulation on the heat exchanger coil 102. In this example, the majority of the refrigerant can continue to pass through the bypass line 210 when the outdoor unit 100 is in the heating mode and only a comparatively small portion of the refrigerant can be permitted to pass through the subcooling line 104 to help the subcooling line 104 to remain heated to help prevent frost accumulation. As another example, the controller 430 can be configured to receive temperature data from a connected temperature sensor and determine whether frost accumulation is likely to occur. If frost accumulation is likely to occur, the controller 430 can be configured to at least partially open the first electronically controlled valve 412A to allow for heated refrigerant to flow through the subcooling line 104 to help prevent the frost accumulation.

As another example, the outdoor unit 100 can include multiple subcooling lines 104 similar to the example described in relation to FIG. 3. In this example, the outdoor unit 100 can include multiple subcooling lines 104 installed in series with one of the electronically controlled valves 412 (412A, 412B . . . 412N, etc.). As will be appreciated by one of skill in the art, by including some of the subcooling lines 104 having an electronically controlled valve 412 installed in series with the subcooling line 104 while other subcooling lines 104 do not include an electronically controlled valve 412 installed in series, the outdoor unit 100 can have the functionality and benefits described in relation to FIG. 3 while also including the additional benefits provided by having an electronically controlled valve 412 as explained in relation to FIG. 4. For example, one or some of the subcooling lines 104 can act as a charge compensator, one or some of the subcooling lines 104 can provide heat to the heat exchanger coil 102 to prevent frost accumulation, the bypass line 210 can be included to bypass the subcooling lines 104 and provide a higher enthalpy refrigerant to the inlet of the heat exchanger coil 102, and the electronically controlled valves 412 can each be actuated to precisely control the operation of the outdoor unit 100.

The controller 430 can have a memory 432, a processor 434, and a communication interface 436. The controller 430 can be a computing device configured to receive data, determine actions based on the received data, and output a control signal instructing one or more components of the outdoor unit 100 and/or indoor unit 150 to perform one or more actions. One of skill in the art will appreciate that the controller 430 can be installed in any location, provided the controller 430 is in communication with at least some of the components of the outdoor unit 100 and/or indoor unit 150. Furthermore, the controller 430 can be configured to send and receive wireless or wired signals and the signals can be analog or digital signals. The wireless signals can include Bluetooth™, BLE, WiFi™, ZigBee™, infrared, microwave radio, or any other type of wireless communication as may be suitable for the particular application. The hard-wired signal can include any directly wired connection between the controller and the other components. Alternatively, the components can be powered directly from a power source and receive control instructions from the controller 430 via a digital connection. The digital connection can include a connection such as an Ethernet or a serial connection and can utilize any suitable communication protocol for the application such as Modbus, fieldbus, PROFIBUS, Safety-Bus p, Ethernet/IP, or any other suitable communication protocol for the application. Furthermore, the controller 430 can utilize a combination of wireless, hard-wired, and analog or digital communication signals to communicate with and control the various components. One of skill in the art will appreciate that the above configurations are given merely as non-limiting examples and the actual configuration can vary depending on the particular application.

The controller 430 can include a memory 432 that can store a program and/or instructions associated with the functions and methods described herein and can include one or more processors 434 configured to execute the program and/or instructions. The memory 423 can include one or more suitable types of memory (e.g., volatile or non-volatile memory, random access memory (RAM), read-only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including the operating system, application programs (including, for example, a web browser application, a widget or gadget engine, and or other applications, as necessary), executable instructions and data. One, some, or all of the processing techniques or methods described herein can be implemented as a combination of executable instructions and data within the memory.

The controller 430 can also have a communication interface 436 for sending and receiving communication signals between the various components. Communication interface 436 can include hardware, firmware, and/or software that allows the processor(s) 434 to communicate with the other components via wired or wireless networks, whether local or wide area, private or public, as known in the art. Communication interface 436 can also provide access to a cellular network, the Internet, a local area network, or another wide-area network as suitable for the particular application.

Additionally, the controller 430 can have or be in communication with a user interface 438 for displaying system information and receiving inputs from a user. The user interface 438 can be installed locally on the outdoor unit 100 and/or indoor unit 150 or be a remotely controlled device such as a mobile device. The user, for example, can view system data on the user interface 438 and input data or commands to the controller 430 via the user interface 438. For example, the user can view and change settings of the first electronically controlled valve 412A and/or the second electronically controlled valve 412B to ensure the outdoor unit 100 performs as desired.

Figure 5:
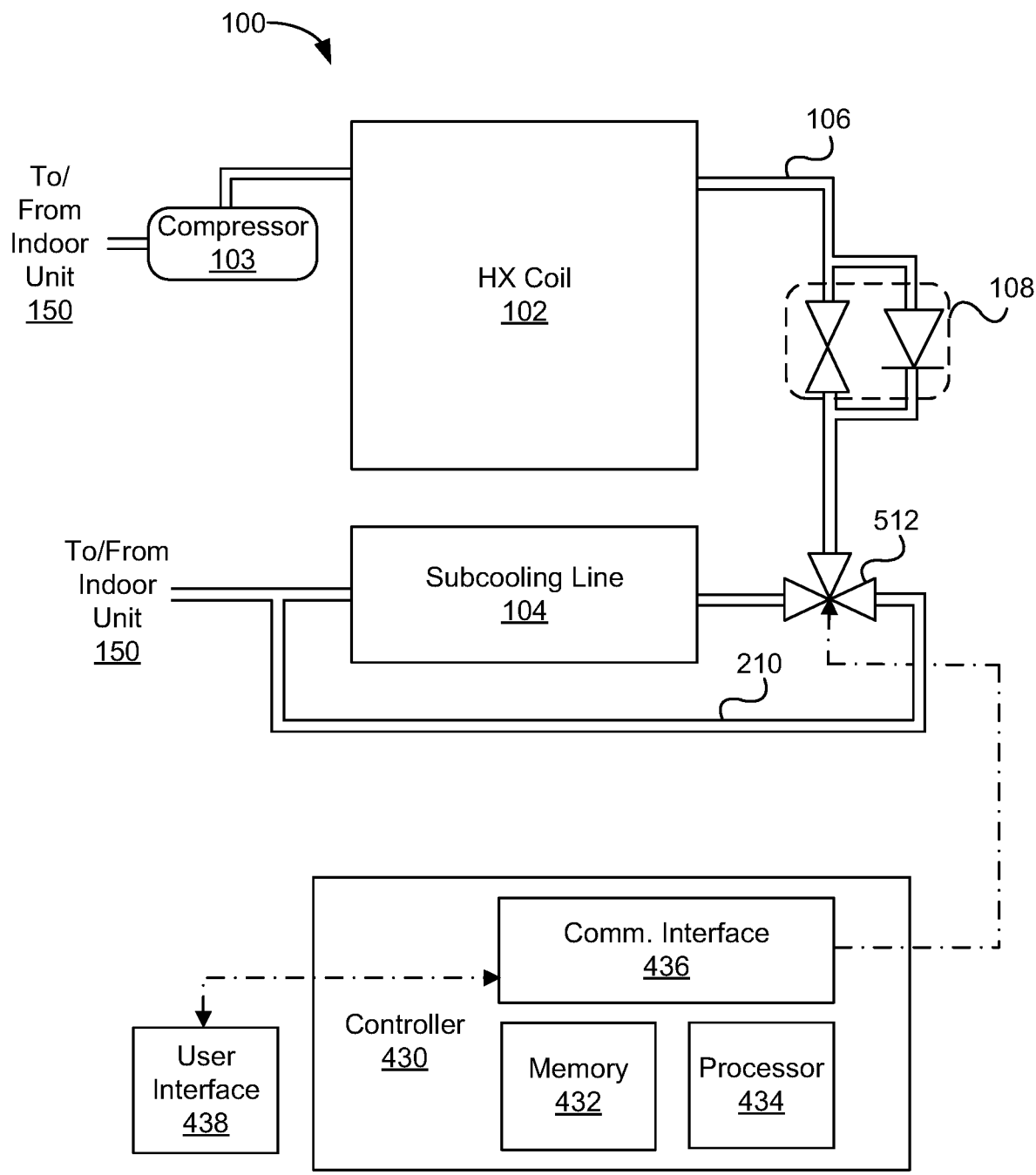
FIG. 5 illustrates an example air conditioning system having a subcooling line and an electronically controlled three-way valve, in accordance with the disclosed technology.

FIG. 5 depicts an outdoor unit 100 that includes a three-way valve 512. In this example, the three-way valve 512 can be installed in place of the first electronically controlled valve 412A and the second electronically controlled valve 412B. As will be appreciated by one of skill in the art, the three-way valve 512 can be configured to direct the refrigerant through the subcooling line 104, through the bypass line 210, or partially through both the subcooling line 104 and the bypass line 210. The three-way valve 512 can be electronically controlled and be in communication with the controller 430. In this way, the controller 430 can output a control signal to change a position of the three-way valve 512 depending on whether the outdoor unit 100 is in a heating mode or a cooling mode, or based on other inputs such as heat exchanger coil 102 temperature, outdoor temperature, outdoor humidity, a superheat temperature of the refrigerant, and/or a subcooling temperature of the refrigerant.

The three-way valve 512 can be similar to the first electronically controlled valve 412A and the second electronically controlled valve 412B in that the three-way valve 512 can be any type of electronically controlled three-way valve that would be suitable for the application. For example, the three-way valve 512 can be or include a motor operated valve or a solenoid operated valve. Furthermore, the three-way valve 512 can be or include a ball valve, a plug valve, a butterfly valve, a gate valve, a globe valve, a needle valve, a coaxial valve, an angle seat valve, or any other type of valve that would be suitable for the particular application.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims.

What is claimed is:

1. An air conditioning unit comprising:
   a heat exchanger coil;
   a first subcooling line in fluid communication with the heat exchanger coil, wherein the first subcooling line is disposed downstream of the heat exchanger coil and is configured to be upstream of an indoor unit;
   a second subcooling line without a valve and in fluid communication with the heat exchanger coil;
   a bypass line in fluid communication with the heat exchanger coil, the bypass line configured to route a refrigerant around the first subcooling line;
   a first valve in fluid communication with the first subcooling line and the heat exchanger coil; and
   a second valve in fluid communication with the bypass line and the heat exchanger coil,
   wherein when the air conditioning unit is operating in a cooling mode:
     the first valve is configured to permit the refrigerant to flow through the first subcooling line; and
     the second valve is configured to prevent the refrigerant from flowing through the bypass line,
   wherein when the air conditioning unit is operating in a heating mode:
     the first valve is configured to prevent the refrigerant from flowing through the first subcooling line; and
     the second valve is configured to permit the refrigerant to flow through the bypass line, and
   wherein the air conditioning unit is an outdoor unit,
     wherein the second subcooling line is configured to permit refrigerant to flow through the second subcooling line when the air conditioning unit is operating in the cooling mode and when the air conditioning unit is operating in the heating mode, and
     wherein the second subcooling line is disposed a first distance from the heat exchanger coil, and the first subcooling line is disposed a second distance from the heat exchanger coil that is greater than the first distance, such that heat transfer from the second subcooling line to the heat exchanger coil prevents frost accumulation.

2. The air conditioning unit of claim 1, wherein the first valve is a first check valve or a first electronically controlled valve, and the second valve is a second check valve or a second electronically controlled valve.

3. The air conditioning unit of claim 2, wherein the first valve is a first electronically controlled check valve, and the second valve is a second electronically controlled check valve, the air conditioning unit further comprising:
   a controller in electrical communication with the first electronically controlled valve and the second electronically controlled valve, wherein, when the air conditioning unit is in the cooling mode, the controller is configured to:
   output a first control signal to the first electronically controlled valve to cause the first electronically controlled valve to open to permit the refrigerant to flow through the first subcooling line, and output a second control signal to the second electronically controlled valve to cause the second electronically controlled valve to close to prevent the refrigerant from flowing through the bypass line.

4. The air conditioning unit of claim 2, wherein the first valve is a first electronically controlled check valve, and the second valve is a second electronically controlled check valve, the air conditioning unit further comprising:
a controller in electrical communication with the first electronically controlled valve and the second electronically controlled valve, wherein, when the air conditioning unit is in the heating mode, the controller is configured to:
output a first control signal to the first electronically controlled valve to cause the first electronically controlled valve to close to prevent the refrigerant from flowing through the first subcooling line, and
output a second control signal to the second electronically controlled valve to cause the second electronically controlled valve to open to permit the refrigerant to flow through the bypass line.

5. The air conditioning unit of claim 4, wherein, when the air conditioning unit is in the heating mode, the controller is further configured to output a third control signal to throttle the first electronically controlled valve to permit a portion of the refrigerant to flow through the first subcooling line.

6. The air conditioning unit of claim 1, wherein the first valve is located in a fluid path between the first subcooling line and the heat exchanger coil.

7. The air conditioning unit of claim 6, wherein the first subcooling line is configured to store an amount of refrigerant when the air conditioning unit is in the heating mode.

8. The air conditioning unit of claim 1, further comprising an expansion and check valve assembly, wherein the first valve is located in a fluid path between the first subcooling line and the expansion and check valve assembly.

9. An air conditioning unit comprising:
a heat exchanger coil;
a first subcooling line in fluid communication with the heat exchanger coil, wherein the first subcooling line is disposed downstream of the heat exchanger coil and is configured to be upstream of an indoor unit;
a second subcooling line without a valve and in fluid communication with the heat exchanger coil;
a bypass line in fluid communication with the heat exchanger coil, the bypass line configured to route a refrigerant around the first subcooling line; and
a valve in fluid communication with the first subcooling line, the bypass line, and the heat exchanger coil, wherein the valve is a three-way check valve or an electronically controlled three-way valve,
wherein when the air conditioning unit is operating in a cooling mode:
the valve is configured to permit the refrigerant to flow through the first subcooling line and prevent the refrigerant from flowing through the bypass line, wherein when the air conditioning unit is operating in a heating mode:
the valve is configured to prevent some of the refrigerant from flowing through the first subcooling line and permit the refrigerant to flow through the bypass line, and
wherein the air conditioning unit is an outdoor unit,
wherein the second subcooling line is configured to permit refrigerant to flow through the second subcooling line when the air conditioning unit is operating in the cooling mode and when the air conditioning unit is operating in the heating mode, and
wherein the second subcooling line is disposed a first distance from the heat exchanger coil, and the first subcooling line is disposed a second distance from the heat exchanger coil that is greater than the first distance, such that heat transfer from the second subcooling line to the heat exchanger coil prevents frost accumulation.

10. The air conditioning unit of claim 9, wherein the valve is located in a fluid path between the first subcooling line, the bypass line, and an expansion and check valve assembly.

11. The air conditioning unit of claim 9, wherein the valve is an electronically controlled three-way check valve, the air conditioning unit further comprising:
a controller in electrical communication with the electronically controlled three-way valve,
wherein, when the air conditioning unit is operating in the cooling mode, the controller is configured to:
output a control signal to the electronically controlled three-way valve to cause the electronically controlled three-way valve to change a position of the electronically controlled three-way valve to permit the refrigerant to flow through the first subcooling line and prevent the refrigerant from flowing through the bypass line.

12. The air conditioning unit of claim 9, wherein the valve is an electronically controlled three-way check valve, the air conditioning unit further comprising:
a controller in electrical communication with the electronically controlled three-way valve,
wherein, when the air conditioning unit is operating in the heating mode, the controller is configured to:
output a control signal to the electronically controlled three-way valve to cause the electronically controlled three-way valve to change a position of the electronically controlled three-way valve to prevent the refrigerant from flowing through the first subcooling line and permit the refrigerant to flow through the bypass line.

13. The air conditioning unit of claim 12, wherein the control signal is a first control signal, and
wherein, when the air conditioning unit is operating in the heating mode, the controller is further configured to output a second control signal to throttle the electronically controlled three-way valve to permit a portion of the refrigerant to flow through the first subcooling line.

14. The air conditioning unit of claim 12, further comprising a second first subcooling line in fluid communication with the heat exchanger coil, the second first subcooling line being configured to permit refrigerant to flow through the second first subcooling line when the air conditioning unit is operating in the cooling mode and when the air conditioning unit is operating in the heating mode.

15. An air conditioning unit comprising:
a heat exchanger coil;
a first subcooling line in fluid communication with the heat exchanger coil, wherein the first subcooling line is disposed downstream of the heat exchanger coil and is configured to be upstream of an indoor unit, and wherein the first subcooling line is routed proximate to a targeted portion of the heat exchanger coil;
a second subcooling line without a valve and in fluid communication with the heat exchanger coil;
a bypass line in fluid communication with the heat exchanger coil, the bypass line configured to route a refrigerant around the first subcooling line; and a valve in fluid communication with the first subcooling line, the bypass line, and the heat exchanger coil, wherein when the air conditioning unit is operating in a cooling mode:
   the valve is configured to permit the refrigerant to flow through the first subcooling line and prevent the refrigerant from flowing through the bypass line, wherein when the air conditioning unit is operating in a heating mode:
   the valve is configured to partially close to prevent some of the refrigerant from flowing through the first subcooling line and permit some of the refrigerant to flow through the bypass line, and wherein the air conditioning unit is an outdoor unit, wherein the second subcooling line is configured to permit refrigerant to flow through the second subcooling line when the air conditioning unit is operating in the cooling mode and when the air conditioning unit is operating in the heating mode, and wherein the second subcooling line is disposed a first distance from the heat exchanger coil, and the first subcooling line is disposed a second distance from the heat exchanger coil that is greater than the first distance, such that heat transfer from the second subcooling line to the heat exchanger coil prevents frost accumulation.

16. The air conditioning unit of claim 15, wherein the targeted portion of the heat exchanger coil is a top portion or a bottom portion, such that the first subcooling line is routed adjacent to the top portion or the bottom portion.

17. The air conditioning unit of claim 15, wherein the targeted portion of the heat exchanger coil is a top portion, wherein the second subcooling line is routed proximate to a bottom portion of the heat exchanger coil.

18. The air conditioning unit of claim 15, further comprising:
   a third subcooling line routed proximate to a middle portion of the heat exchanger coil.

\* \* \* \* \*